350-430

XR    4,145,732

United States

Pandres, Jr.

[11] 4,145,732
[45] Mar. 20, 1979

[54] RATIO PRESERVING CONTROL SYSTEM FOR A LENS

[76] Inventor: Dave Pandres, Jr., 111 Walker Dr., Dahlonega, Ga. 30533

[21] Appl. No.: 895,139

[22] Filed: Apr. 10, 1978

Related U.S. Application Data

[63] Continuation-in-part of Ser. No. 820,005, Jul. 28, 1977.

[51] Int. Cl.² .................... G06G 7/66; G02B 7/10
[52] U.S. Cl. ................... 364/109; 364/117; 350/187
[58] Field of Search ............ 364/109, 117, 722, 850, 364/857; 350/184, 186, 187, 75, 206; 352/140, 141; 354/196

[56] References Cited

U.S. PATENT DOCUMENTS

| 1,950,166 | 3/1934 | Durholz | 350/187 X |
| 2,663,223 | 12/1953 | Hopkins | 350/184 |
| 3,733,476 | 5/1973 | Hopkins et al. | 364/109 X |
| 3,765,748 | 10/1973 | Mito | 350/187 |
| 3,834,648 | 9/1974 | Rose, Jr. et al. | 364/109 X |
| 4,048,964 | 9/1977 | Kissel | 364/109 X |

FOREIGN PATENT DOCUMENTS

| 1183354 | 12/1964 | Fed. Rep. of Germany | 350/187 |
| 47-854206 | 12/1972 | Japan | 350/187 |
| 481389 | 9/1968 | Switzerland | 350/187 |
| 1183354 | 12/1964 | Fed. Rep. of Germany | 350/187 |

*Primary Examiner*—Joseph F. Ruggiero
*Attorney, Agent, or Firm*—B. J. Powell

[57] ABSTRACT

A ratio preserving control system for a camera zoom lens for selectively interconnecting the object distance (focus) control mechanism and the focal length (zoom) control mechanism to selectively and automatically maintain a selected ratio between the object distance value of the lens and the focal length value of the lens so as to maintain a selected constant image size while the focal length value is changed to keep an object in focus when the distance between the object and the lens is changing or changes.

7 Claims, 3 Drawing Figures

RATIO PRESERVING CONTROL SYSTEM FOR A LENS

CROSS-REFERENCE TO RELATED APPLICATIONS

This application is a continuation-in-part of my copending application Ser. No. 820,005, filed July 28, 1977 for "Ratio Preserving Control System".

BACKGROUND OF THE INVENTION

Many systems today require different system operating parameters to be changed in value where each of these operating parameters is independently changed by a different control input. The change in value of any one of the system operating parameters as a function of the change in its control input quantity may be linear or non-linear, although such change is usually a non-linear function which is monotonic. Moreover, the non-linear functional relationship between each operating parameter and its control input is usually different for each operating parameter.

The problems of interrelating multiple, independently changeable, system operating parameters are more commonly encountered in the use of a camera zoom lens system, either in still photography, movie photography, or television. These zoom lens systems are usually controlled by two parameters, object distance for focus and focal length for zoom. Each of these parameters is controlled by independent control mechanisms which are either manually operated or power operated. It is desirable on occasion to keep the image size from the lens system constant even though the distance between the subject being photographed and the lens system varies. With a zoom lens system, it is possible to keep the image size constant if the ratio between the object distance setting of the lens system and the focal length setting is maintained at a predetermined constant ratio. Because both distance and zoom vary the image size from the lens system, maintaining a constant image size manually is unfeasible since it requires simultaneous varying of both object distance to focus and focal length to zoom when the distance is changing. No system is presently available which is able automatically to maintain a constant image size from a lens system where simultaneous manual or power operated adjustment of both object distance and focal length are required.

SUMMARY OF THE INVENTION

These and other problems and disadvantages associated with the prior art are overcome by the invention disclosed herein by providing an apparatus for and method of collectively maintaining a desired ratio between the values of different systems operating parameters as the value of one of these operating parameters is varied where the value of each operating parameter is normally independently controlled by a different control mechanism. The invention further provides a means for selectively changing the ratio that is being maintained between the values of the different system operating parameters. The invention provides for the automatic maintenance of the desired ratio between the values of the system operating parameters and thus is able to reduce the number of degrees of independence in the control of the system operating parameters. This is true even if the rate of change of the values of the system operating parameters is different as long as the value function of such system operating parameters is monotonic.

While not intended to be limiting, the apparatus of the invention is incorporated on a camera zoom lens which has an object distance control parameter and a focal length control parameter that are normally controlled independently of each other. The apparatus of the invention includes generally an object distance sending means for generating a first output which is the logarithmic value to a common base of the actual value of the object distance control parameter set by the object distance control mechanism, and a focal length sending means for generating a second output which is the logarithmic value to the same common base of the actual value of the focal length control parameter set by the focal length control mechanism. The apparatus of the invention also includes a control means which compares the first and second outputs from the object distance and focal length sending means and generates appropriate control outputs to operate the focal length and/or control mechanisms to maintain a predetermined difference between the first and second outputs. This serves to maintain a prescribed ratio between the set value in the object distance parameter and the set value in the focal length parameter so that a constant image size is maintained. The control means includes an adjustment mechanism for selectively changing the difference between the first and second outputs which will be maintained by the control means. This serves to change the ratio of the set value of the object distance control parameter with respect to the set value of the focal length control parameter even though the control means is operatively connected to the zoom lens system.

These and other features and advantages of the invention will become more clearly understood upon consideration of the following description and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
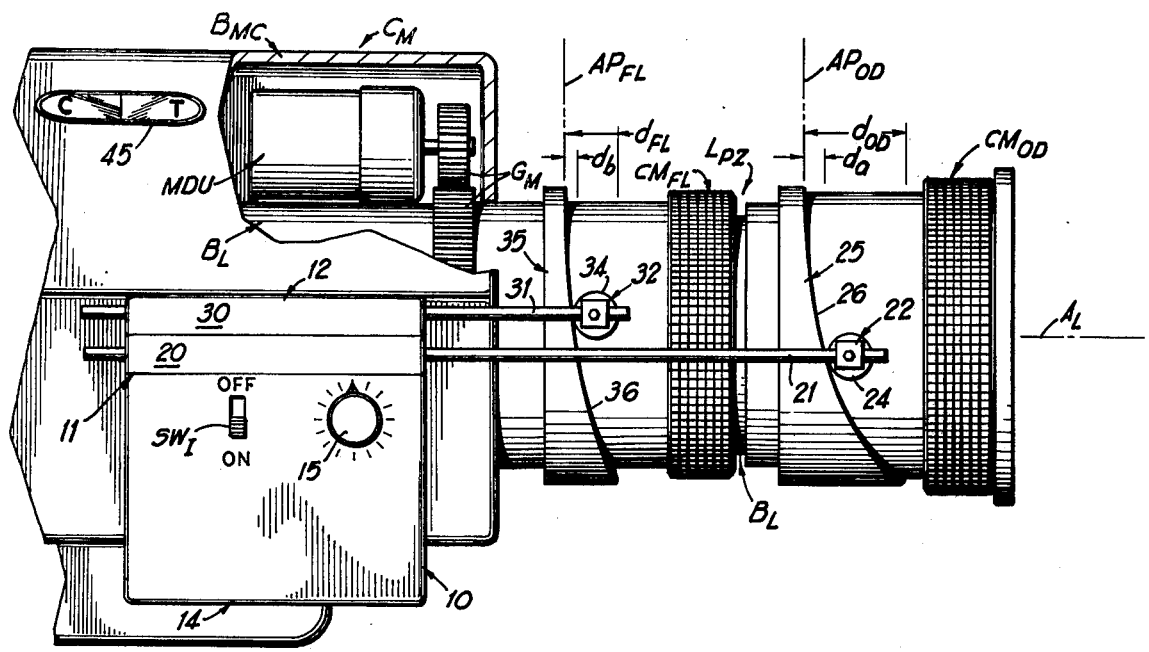
FIG. 1 is a partial side elevational view of a camera zoom lens on which an embodiment of the invention is incorporated.

The invention of this application is disclosed as applied to a power zoom lens $L_{PZ}$ such as those normally used on a movie camera $C_M$ (partly seen in FIG. 1). It is to be appreciated, however, that the concepts of the invention can be just as easily applied to any other movie, still, or television camera with a power zoom lens. Also, it is to be understood that the concepts of this application can be likewise applied to a wide variety of systems which have two or more independently variable control parameters. The lens $L_{PZ}$ has an object distance (focus) control member $CM_{OD}$ and a focal length (zoom) control member $CM_{FL}$ rotatably mounted on the lens body $B_L$ for rotation about the lens axis $A_L$. The control member $CM_{OD}$ is usually manually controlled while control member $CM_{FL}$ is usually alternatively manually controlled or electrically powered by reversible electric motor drive unit MDU through gears $G_M$ as seen in FIG. 1. The motor drive unit MDU and gears $G_M$ are usually housed in the camera body $B_{MC}$.

The invention is incorporated in an interlock control mechanism 10 which is operatively connected to both the control members $CM_{OD}$ and $CM_{FL}$ and the motor drive unit MDU. The interlock control mechanism 10 is seen in FIG. 1 as including an object distance sending unit 11 and a focal length sending unit 12 along with a ratio base control unit 14. The ratio base control unit 14 has a manually operated ratio selector knob 15 that allows the ratio maintained between the object distance parameter and the focal length parameter to be selectively changed and an interlock switch $SW_I$ which allows the ratio base control unit 14 to be switched on an off to convert the lens $L_{PZ}$ from manual to automatic operation. It will be appreciated that this application discloses an improvement over application Ser. No. 820,005 and, therefore, incorporates the disclosure of that application herein by reference.

The object distance sending unit 11 includes a linear potentiometer assembly 20 which is mounted on the side of the camera body $B_{MC}$ so that it is axially fixed with respect to the lens $L_{PZ}$. The linear potentiometer assembly 20 includes a drive rod 21 movably mounted in the linear potentiometer assembly 20 so that it projects along the lens $L_{PZ}$ generally parallel to the lens axis $A_L$ but spaced along the side of the lens $L_{PZ}$ so that it lies outboard of the object distance control member $CM_{OD}$. The drive rod 21 mounts on the projecting end thereof adjacent the object distance control member $CM_{OD}$, a cam follower roller assembly 22 which can be selectively fixed in a conventional manner along the length of the drive rod 21 for adjustment. The cam follower roller assembly 22 includes a cam follower roller 24 which projects inboard from the drive rod 21 so that it lies adjacent the object distance control member $CM_{OD}$ as will become more apparent. The drive rod 21 is axially movable into and out of the linear potentiometer assembly 20 and is constantly spring urged into the linear potentiometer assembly 20 in conventional manner. The cam follower roller 24 rides against an object distance cam 25 which is carried by the object distance control member $CM_{OD}$ so that the object distance cam rotates with the object distance control member $CM_{OD}$ about the lens axis $A_L$ as the object control member $CM_{OD}$ is rotated to focus the lens. The object distance cam 25 defines an object distance camming surface 26 thereon along which the cam follower roller 24 rides. The spring pressure constantly exerted on the cam follower roller 24 urges the cam follower roller 24 into continuous contact with the cam surface 26. The generation of this cam surface 26 will be explained in more detail.

Likewise, the focal length sending unit 12 comprises a linear potentiometer assembly 30 which is mounted on the side of the camera body $B_{MC}$ so that it is axially fixed with respect to the lens $L_{PZ}$. The linear potentiometer assembly 30 includes a drive rod 31 movably mounted in the linear potentiometer assembly 30 so that it projects along the lens $L_{PZ}$ generally parallel to the lens axis $A_L$ but spaced along the side of the lens $L_{PZ}$ so that it lies outboard of the focal length control member $CM_{FL}$. The drive rod 31 mounts on the projecting end thereof adjacent the focal length control member $CM_{FL}$, a cam follower roller assembly 32 which can be selectively fixed in a conventional manner along the length of the drive rod 31 for adjustment. The cam follower roller assembly 32 includes a cam follower roller 34 which projects inboard from the drive rod 31 so that it lies adjacent the focal length control member $CM_{FL}$ as will become more apparent. The drive rod 31 is axially movable into and out of the linear potentiometer assembly 30 and is constantly spring urged into the linear potentiometer assembly 30 in conventional manner. The cam follower roller 34 rides against focal length cam 35 which is carried by the focal length control member $CM_{FL}$ so that the focal length cam rotates with the focal length control member $CM_{FL}$ about the lens axis $A_L$ as the focal length control member $CM_{FL}$ is rotated to focus the lens. The object distance cam 35 defines a focal length camming surface 36 thereon along which the cam follower roller 34 rides. The spring pressure constantly exerted on the cam follower roller 34 urges the cam follower roller 34 into continuous contact with the cam surface 36. The generation of this cam surface 36 will be explained in more detail.

The object distance cam 25 and the focal length cam 35 may be made as an integral part of each of their associated control members $CM_{OD}$ or $CM_{FL}$ or may be made separately and attached thereto. The interlock control mechanism 10 illustrated in FIG. 1 has been applied to an already existing movie camera $C_M$ with the cams 25 and 35 being made as split rings which are clamped onto the appropriate control members $CM_{OD}$ and $CM_{FL}$ with appropriate clamping mechanisms (not shown) so that, as each control member $CM_{OD}$ or $CM_{FL}$ is rotated, the control cam 25 or 35 associated therewith rotates with the control member onto which it is clamped. This allows alignment between the relative rotational position of the linear potentiometer assembly 20 or the linear potentiometer assembly 30 about the lens $L_{PZ}$ to appropriately adjust the mechanism.

The shape of the camming surfaces 26 and 36 are determined by the particular range of values in the parameter being controlled by the control member to which the cam 25 or 35 is attached and serves to convert the rotational position of the contrl members $CM_{OD}$ and $CM_{FL}$ into axial displacement of the drive rods 21 and 31 so that the voltage output from the potentiometer assembly 20 or 30 associated with the particular drive rod corresponds to the logarithmic value to some common base of the operating control parameter set by the control member $CM_{OD}$ or $CM_{FL}$. Since the voltage output of the potentiometer assemblies 20 and 30 are linear, it will be seen that the shape of the cam surfaces 26 and 36 are also logarithmic. It does not matter on what base the logarithmic value is determined, but the base used to determine the logarithmic value should be the same for the object distance camming surface 26 and the focal length camming surface 36.

Figure 3:
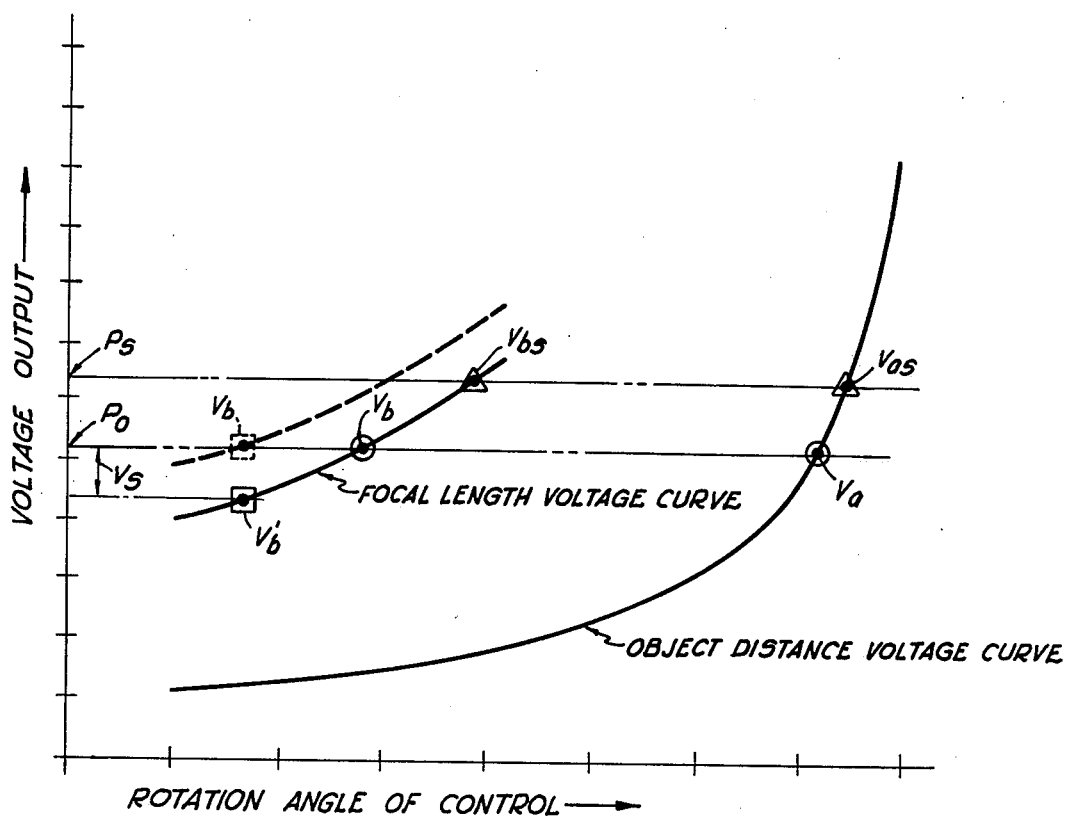
FIG. 3 is a composite graph illustrating the operation of the invention.

As mentioned above, the shape of the object distance camming surface 26 is determined by the particular object distance values in the range of the object distance control parameter and is set by the logarithmic values corresponding to the value of the object distance parameter versus the control member rotational displacement relative to some reference point on the lens. While the actual object distance values may be used in the following calculations, dividing the actual object distance value by the smallest object distance value in the range of the object distance parameter facilitates such calculations, and this technique is used. This technique is not meant to be limiting, however, but allows the object distance camming surface 26 to start at "0" for graphing purposes. It will be seen from FIG. 1 that the camming surface 26 will displace the cam follower roller 24 axially along the lens axis $A_L$ with respect to a base axial object distance reference plane $AP_{OD}$ normal to the lens axis a particular distance $d_a$ as seen in FIG. 1 somewhere within the total distance $d_{OD}$ of the range of the camming surface 26. The particular distance $d_a$ that the camming surface 26 displaces the cam follower roller 24 and thus the drive rod 21 axially along the lens axis $A_L$ is determined by the equation $$d_a = K \log_x \frac{\text{actual object distance value}}{\text{smallest object distance value}}$$

where the actual object distance value is that set in the lens $L_{PA}$ by a particular rotational position of the object distance control member $CM_{OD}$, where x is any convenient base for the logarithm, and where K is a constant. Thus, for each actual object distance value in the range of the object distance control parameter to which the lens $L_{PZ}$ can be set, there is a corresponding point on the camming surface 26 which displaces the cam follower roller 24 axially from the axial base object distance reference plane $AP_{OD}$ the distance $D_a$ determined by the above equation. In effect, what is happening is that the cam follower roller 24 moves the drive rod 21 in the linear potentiometer assembly 20 so that the voltage output of the linear potentiometer assembly 20 corresponds to the logarithmic value represented by the distance $d_a$. The curve labelled "Object Distance Voltage Curve" in FIG. 3 shows generally the shape of the object distance camming surface 26. It will be appreciated that the object distance control member $CM_{OD}$ also usually moves axially a short distance with respect to the lens body $B_L$ as it is adjusted. The curve seen in FIG. 3 accounts for this small axial movement of the control member $CM_{OD}$ and would also be incorporated in the shape of camming surface 26.

Likewise, the shape of the focal length camming surface 36 is determined by the particular focal length values in the range of the focal length control parameter and is set by the logarithmic values corresponding to the value of the focal length parameter versus the control member rotational displacement relative to some reference point on the lens. While the actual focal length values may be used in the following calculations, dividing the actual focal length value by the smallest focal length value in the range of the focal length parameter facilitates such calculations, and this technique is used. This technique is not meant to be limiting, however, but allows the focal length camming surface 36 to start at "0" for graphing purposes. It will be seen from FIG. 1 that the camming surface 36 will displace the cam follower roller 34 axially along the lens axis $A_L$ with respect to a base axial focal length reference plane $AP_{FL}$ normal to the lens axis a particular distance $d_b$ as seen in FIG. 1 somewhere within the total distance $d_{FL}$ of the range of the camming surface 36. The particular distance $d_b$ that the camming surface 36 displaces the cam follower roller 34 and thus the drive rod 31 axially along the lens axis $A_L$ is determined by the equation $$d_b = K \log_x \frac{\text{actual focal length value}}{\text{smallest focal length value}}$$

where the actual focal length value is that set in the lens $L_{PZ}$ by a particular rotational position of the focal length control member $CM_{FL}$, where x is the common base for the logarithm used for object distance, and where K is the same constant used for the object distance curve. Thus, for each actual focal length value in the range of the focal length control parameter to which the lens $L_{PZ}$ can be set, there is a corresponding point on the camming surface 36 which displaces the cam follower roller 34 axially from the axial base focal length reference plane $AP_{FL}$ the distance $d_b$ determined by the above equation. In effect, what is happening is that the cam follower roller 34 moves the drive rod 31 in the linear potentiometer assembly 30 so that the voltage output of the linear potentiometer assembly 30 corresponds to the logarithmic value represented by the distance $d_b$. The curve labelled "Focal Length Voltage Curve" in FIG. 3 shows generally the shape of the focal length camming surface 36.

Figure 2:
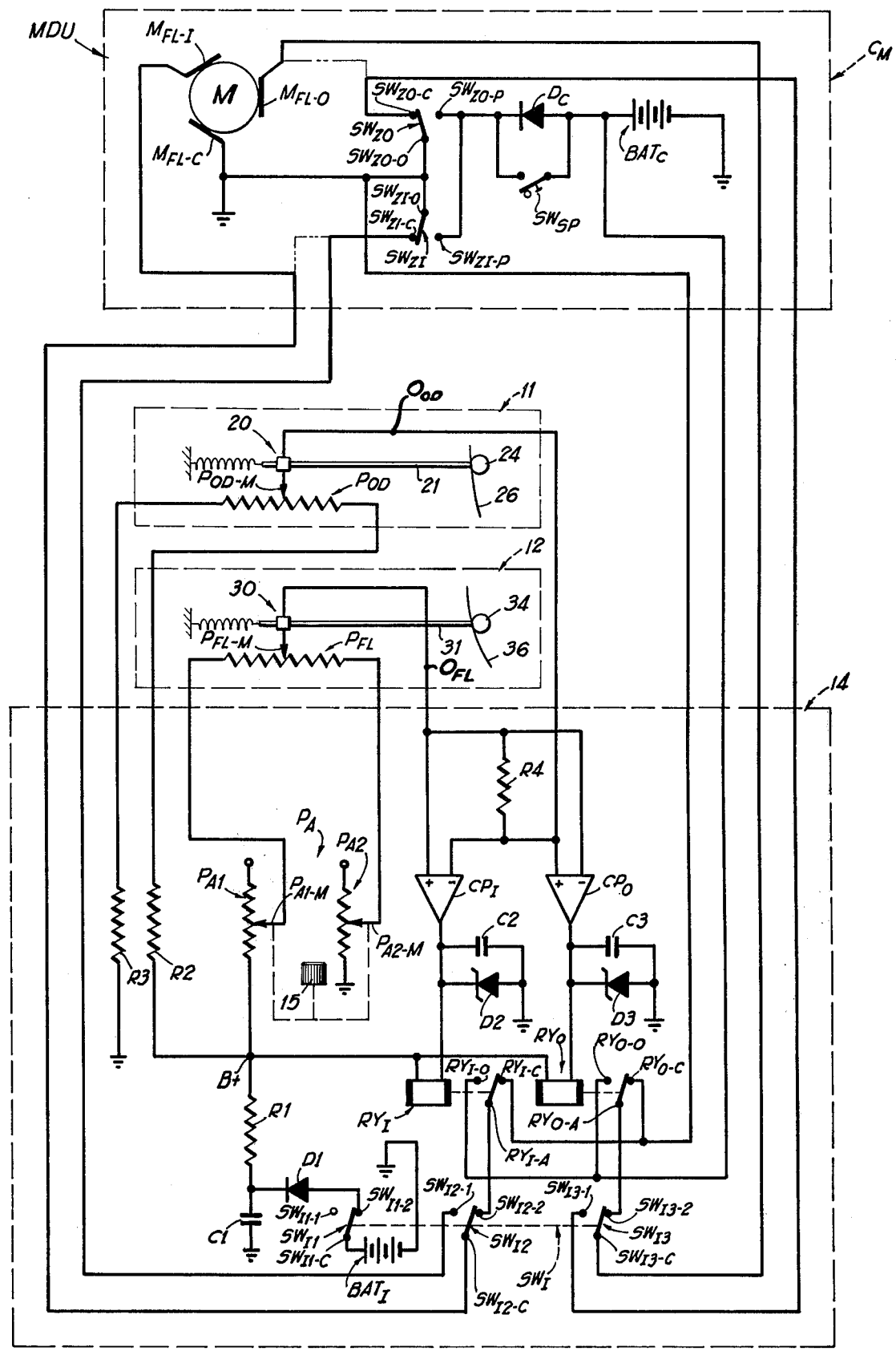
FIG. 2 is an electrical schematic of the control circuit associated with the invention seen in FIG. 1.

The control circuit for the interlock control mechanism 10 is illustrated in detail in FIG. 2. It will be appreciated that the motor drive unit MDU in the movie camera $C_M$ already includes a control circuit which allows the focal length control parameter of the lens $L_{PZ}$ to be changed. It is necessary to interface the control circuitry associated with the interlock control mechanism 10 with this preexisting circuitry in the motor drive unit MDU so that the camera user still has the benefit of the existing capabilities of the movie camera $C_M$ while at the same time having an additional capability supplied by the interlock control mechanism 10.

To understand how the control circuitry associated with the interlock control mechanism 10 interfaces with the already existing circuitry in the motor drive unit MDU, the upper portion of the schematic of FIG. 2 illustrates a typical control circuit for the motor drive unit MDU. As is conventional, the camera $C_M$ has a battery $BAT_C$, usually about 6-9 volts d.c. and a reversible focal length drive motor $M_{FL}$. It will be further appreciated that the motor $M_{FL}$ has a common contact $M_{FL-C}$, a contact $M_{FL-O}$ which causes the motor to drive the focal length control member $CM_{FL}$ out toward its zoom position and another contact $M_{FL-I}$ which drives the motor so that the focal length control member $CM_{FL}$ moves toward its wide angle position. A switch $SW_{ZO}$ is used to connect the contact $M_{FL-O}$ to the battery $BAT_C$ and another switch $SW_{ZI}$ is used to connect the contact $M_{FL-I}$ to the battery $BAT_C$. Usually, the common contact $SW_{ZO-C}$ of switch $SW_{ZO}$ is connected to the motor contact $M_{FL-O}$ with its normally open contact $SW_{ZO-P}$ connected to the battery $BAT_C$. The normally closed contact $SW_{ZO-O}$ is connected to ground so that when the switch $SW_{ZO}$ is open, the motor $M_{FL}$ is free to rotate to allow manual adjustment of the focal length control member $CM_{FL}$. Likewise, the common contact $SW_{ZI-C}$ of switch $SW_{ZI}$ is usually connected to the motor contact $M_{FL-I}$ while the normally open contact $SW_{ZI-P}$ is connected to the battery $BAT_C$. Also, the normally closed contact $SW_{ZI-O}$ is usually connected to ground to allow free rotation at the motor $M_{FL}$ when the switch $SW_{ZI}$ is open. While different configurations may be used for different movie cameras, the particular circuit shown incorporates diode $D_C$ as a voltage regulator which connects the battery $BAT_C$ to the normally open contacts $SW_{ZO-P}$ and $SW_{ZI-P}$. Also, this particular circuit has a speed switch $SW_{SP}$ which is connected in parallel across the diode $D_C$ so that when the Zener diode $d_{ZC}$ is shunted out upon closure of switch $SW_{SP}$, the motor $M_{FL}$ will run faster. This particular circuit is shown modified to interface with the interlock control mechanism 10. The original existing connections between the common contacts $SW_{ZO-C}$ and $SW_{ZI-C}$ and motor $M_{FL}$ are shown by the phantom lines in FIG. 2. This circuit is modified by opening the line connecting common contact $SW_{ZO-C}$ to the motor contact $M_{FL-O}$ and reconnecting it through the control circuitry of the interlock mechanism 10 as will become more apparent. In like manner, the line connecting the common contact $SW_{ZI-C}$ to the motor contact $M_{FL-I}$ is opened and reconnected through the control circuitry for the interlock control mechanism 10 as will become more apparent. This allows the control circuitry normally associated with the motor drive unit MDU to be used in conventional manner when the interlock control mechanism 10 is in its "Off" or manual position but disables the control circuitry of the motor drive unit MDU when the interlock control mechanism 10 is in its "On" or automatic position. It will further be appreciated that the switches $SW_{ZO}$ and $SW_{ZI}$ are normally controlled by a pivoted actuator member 45 seen in FIG. 1 so that if you press the end of the actuator member 45 identified with a "T", switch $SW_{ZO}$ will be closed whereas if you press that end of the actuator member 45 marked "C", switch $SW_{ZI}$ will be closed.

The object distance sending unit 11 is schematically shown in FIG. 2 as well as the focal length sending unit 12. It will be noted that the object distance sending unit 11 includes a linear potentiometer $P_{OD}$ with a movable contact $P_{OD-M}$. In similar manner, the focal length sending unit 12 includes linear potentiometer $P_{FL}$ with a movable contact $P_{FL-M}$.

The ratio base control unit 14 is also shown schematically in FIG. 2 as well as the connections of the control unit 14 with the circuitry of the motor drive unit MDU, the object distance sending unit 11, and the focal length sending unit 12. It will be seen that the selector switch $SW_I$ used to activate and deactivate the control unit 14 is a gang switch consisting of three separate switches $SW_{I1}$–$SW_{I3}$, each of which has a common contact, a first closeable contact and a second closeable contact. The switch $SW_{I1}$ controls the power network PN of the control unit 14, the switch $SW_{I2}$ controls the motor contact $M_{FL-I}$ while the switch $SW_{I3}$ controls the motor contact $M_{FL-O}$.

The power network PN consists of a battery $BAT_I$, the switch $SW_{I1}$, and a regulator network comprising a diode $D_1$, capacitor $C_1$, and a regulator resistor $R_1$. It will be seen that the common contact $SW_{I1-C}$ of switch $SW_{I1}$ is connected to the positive side of the battery $BAT_I$ while the contact $SW_{I1-2}$ is connected to the diode so that a regulated voltage output from the power network PN is provided at the point identified as $B^+$. This output is used to drive the control unit 14 as well as the sending units 11 and 12. It will be seen that the $B^+$ output from the power network PN is connected to one end of the fixed resistance of the potentiometer $P_{OD}$ through resistor $R_2$ while the other end of the fixed resistance in the potentiometer $P_{OD}$ is connected to ground through resistor $R_3$. The $B^+$ output of the power network PN is connected across the fixed resistance of the potentiometer $P_{FL}$ through a variable potentiometer assembly $P_A$ which comprises a pair of ganged potentiometers identified as potentiometers $P_{A1}$ and $P_{A2}$. One end of the fixed resistance in potentiometer $P_{A1}$ is connected to the $B^+$ output of the power network PN while its movable contact $P_{A1-M}$ is connected to one end of the fixed resistance in the potentiometer $P_{FL}$. The other end of the fixed resistance in the potentiometer $P_{FL}$ is connected to the movable contact $P_{A2-M}$ of the potentiometer $P_{A2}$ while one end of its fixed resistance is connected to ground. It will be appreciated that the control knob 15 operates the potentiometers $P_{A1}$ and $P_{A2}$ in synchronization with each other as will become more apparent.

The $B^+$ output of the power network $P_N$ is also connected to one side of the relay coils in relays $RY_I$ and $RY_O$ as will become more apparent.

The movable contact $P_{OD-M}$ of the object distance potentiometer $P_{OD}$ is connected to "–" input of a comparator $CP_I$ and also to the "+" input of a comparator $CP_O$. The movable contact $P_{FL-M}$ of the focal length potentiometer $P_{FL}$ is connected to the "+" input of comparator $CP_I$ and also to the "–" input of the comparator $CP_O$. The movable contact $P_{OD-M}$ and $P_{FL-M}$ are also connected to each other through biasing resistor R4. The comparators $CP_I$ and $CP_O$ are conventionally available and are powered in conventional manner such as with the $B^+$ output from the power network PN as is well known in the art. An example of such comparators is commercially available as a dual comparator integrated circuit chip designated LM319 from National Semiconductor Corporation. The output of the Comparator $CP_I$ is connected to the other side of the relay coil of relay $RY_I$ and also to ground through the protection network consisting of the Zener diode D2 and the capacitor C2. In this arrangement, it will be seen that when the voltage output from the movable contact $P_{OD-M}$ is less than the voltage output from the movable contact $P_{FL-M}$, the comparator $CP_I$ will generate the appropriate output to cause the relay coil of relay $RY_I$ to be energized. Likewise, the output from the comparator $CP_O$ is connected to the other side of the relay coil of relay $RY_O$ and also to ground through the protection network comprising the capacitor C3 and Zener diode D3. Thus, when the voltage output from the movable contact $P_{OD-M}$ is greater than the voltage output from the movable contact $P_{FL-M}$, an appropriate output will be generated by the comparators $CP_O$ which will cause the relay coil of relay $RY_O$ to be energized.

The relay $RY_I$ is used to control the motor contact $M_{FL-I}$ while the relay $RY_O$ is used to control the motor contact $M_{FL-O}$. Each of the relays $RY_O$ and $RY_I$ has a common contact, a normally open contact, and a normally closed contact. The common contact $RY_{I-A}$ of relay $RY_I$ is connected to the contact $SW_{I2-2}$ of switch $SW_{I2}$. The normally closed contact $RY_{I-C}$ is connected to the common ground on the motor drive unit MDU while the normally open contact $RY_{I-O}$ is connected to the camera battery $BAT_C$. The common contact $RY_{O-A}$ of the relay $RY_O$ is connected to the contact $SW_{I3-3}$ of the switch $SW_{I3}$. The normally closed contact $RY_{O-C}$ is connected to the common ground of the motor drive unit MDU while the normally open contact $RY_{O-O}$ is connected to the camera battery $BAT_C$. Thus, it will be seen that when relay $RY_I$ is transferred, it connects the camera battery to the switch $SW_{I2}$ so that the motor $M_{FL}$ can be controlled through the switch $SW_{I2}$. On the other hand, when the relay $RY_O$ is transferred, the camera battery $BAT_C$ is connected to the switch $SW_B$ to alternatively control the motor $M_{FL}$ in the motor drive unit MDU. The relays $RY_I$ and $RY_O$ in FIG. 2 are shown in their de-energized positions while the switch $SW_I$ is shown with its ganged switches in their "On" or automatic position.

The ganged potentiometer assembly $P_A$ controls the ratio which is to be maintained between the value of the object distance parameter versus the value of the focal length parameter. The comparators $CP_I$ and $CP_O$ drive the motor $M_{FL}$ to shift the value of the focal length parameter until the voltage output from the movable contact $P_{FL-M}$ equals the voltage output from the movable contact $P_{OD-M}$. In effect, this is maintaining the difference in the logarithmic equivalent of the object distance value and the logarithmic equivalent of the focal length value at zero as far as is seen by the comparators $CP_I$ and $CP_O$. The use of the ganged potentiometer assembly $P_A$ allows the apparent voltage output difference seen by the comparators $CP_I$ and $CP_O$ to be maintained at zero to simplify the circuit. In effect, the ganged potentiometer assembly $P_A$ is used to raise or lower the apparent voltage output from movable contact $P_{FL-M}$ by a constant amount at each setting of the ganged potentiometer assembly $P_A$. This is achieved by selecting the value of resistors R2 and R3 equal to each other and equal to the value of the fixed resistance of the potentiometers $P_{OD}$. Then, the fixed resistance of the potentiometer $P_{FL}$ is selected so that it is the same as the value of each of the resistors R2 and R3, and the fixed resistance of the potentiometer $P_{OD}$. Once this is done, the value of the fixed resistance of each of the potentiometers $P_{A1}$ and $P_{A2}$ are selected as equal with each having a value somewhere between the value of resistor R2 or R3 and two times the value of the resistor R2 or R3. It will follow then that, if the value of the fixed resistance of each of the potentiometers $P_{A1}$ and $P_{A2}$ are selected as equal to the value of the resistance of resistor R2 or R3, the ends of the potentiometers $P_{A1}$ and $P_{A2}$ not shown as connected on FIG. 2 would be connected with a wire so that they would be shorted with each other. This would produce the desired variable provided the fixed resistance of the potentiometers $P_{A1}$ and $P_{A2}$ were ganged as shown and connected as shown so that the effective relative resistances used by the movable contacts $P_{A1-M}$ and $P_{A2-M}$ summed to the selected value of the fixed resistance of the potentiometer $P_{A1}$ and $P_{A2}$.

Because there is a relationship between the resistive values of the potentiometers $P_{OD}$, $P_{FL}$, $P_{A1}$ and $P_{A2}$; and the resistors R2 and R3, choosing the resistive values of potentiometers $P_{OD}$ and $P_{FL}$ as equal simplifies the determination of the remaining resistive values and this is the case in this application. The relationship is further simplified when the resistive values of resistors R2 and R3 are each selected as equal to the resistive value of potentiometer $P_{OD}$ or $P_{FL}$ and this is the case in this application. For illustration purposes, say the resistive value of potentiometers $P_{OD}$ and $P_{FL}$ as well as resistors R2 and R3 is selected as "R".

It will further be noted that the fixed resistances of the potentiometers $P_{A1}$ and $P_{A2}$ are selected as equal to each other to give proper voltage output curve shift. Under these conditions, it will be seen that, if full range of operation of the controls is desired, then the resistive value of each of potentiometers $P_{A1}$ and $P_{A2}$ is limited to a range of "R" to "2R". In one limiting case, that illustrated in the drawings, the resistive value of each potentiometer $P_{A1}$ and $P_{A2}$ is selected as "2R" and one end of the fixed resistance in each is left open or unconnected. In the other limiting case (not shown in the drawings), the resistive value of each potentiometer $P_{A1}$ and $P_{A2}$ would be "R" and those ends of the fixed resistances shown unconnected in the drawings would be shorted to each other. Because selecting the value for potentiometers $P_{A1}$ and $P_{A2}$ at "R" results in maximum circuit current drain while selecting the value at "2R" results in minimum circuit current drain, the value selected in the illustrated circuit is "2R". In the case where the resistive value of potentiometers $P_{A1}$ and $P_{A2}$ is selected somewhere between the limiting values of "R" and "2R", then some calculated resistance would be placed between the unconnected ends of the fixed resistance of the potentiometers $P_{A1}$ and $P_{A2}$. While the values of the various components may be changed, Table I at the end of the specification shows values which have been found to work satisfactorily.

It will be further appreciated that the lens $L_{PZ}$ has two degrees of freedom. The interlock mechanism 10 allows the two control parameters to be interconnected so that the number of degrees of freedom are reduced to one. This greatly simplifies the operation of the lens $L_{PZ}$ so as to keep the image size constant while the distance between the subject being photographed and the lens changes. Recently, cameras with automatic focusing have been developed. The mechanism 10 can be easily added to these automatic focusing cameras when they are equipped with a zoom lens so that, with the automatic focusing feature, the number of degrees of freedom of the lens system is reduced to zero.

The required power of the electric motor $M_{FL}$ is relatively low to operate the control member $CM_{FL}$. Because of this, the control member $CM_{FL}$ can be manually shifted momentarily by overpowering the motor $M_{FL}$ if it is desirable to momentarily change the focal length parameter. When the control member $CM_{FL}$ is released, the motor $M_{FL}$ will power the control member $CM_{FL}$ back to its prescribed ratio position for continued operation. From the foregoing, it will be seen that this embodiment of the interlock mechanism 10 is partly mechanical and partly electrical. It is to be understood, however, that different arrangements of the mechanism 10 may be used and that any number of different system operating parameters may be interrelated in the desired manner using the teachings of the mechanism 10 or its equivalent.

OPERATION

Reference to FIG. 3 will more clearly illustrate the operation of the invention. The output $O_{OD}$ (FIG. 2) of the object distance sending unit 11 is the voltage equivalent of the logarithmic value of the value to which the control members $CM_{OD}$ have set the object distance parameter of the lens $L_{PZ}$. Similarly, the output $O_{FL}$ (FIG. 2) of the focal length sending unit 12 is the voltage equivalent of the logarithmic value of the value to which the control member $CM_{FL}$ has set the focal length parameter of the lens $L_{PZ}$ plus the shifted value of the potentiometer assembly $P_A$. In other words, the output $O_{FL}$ adds the shifted value to which the potentiometer assembly $P_A$ is set to the logarithmic value set by the control member $CM_{FL}$. This allows the output $O_{FL}$ to be appropriately adjusted so that the focal length voltage curve can be matched to any point on the object distance voltage curve as will become more apparent.

A better understanding of the significance of the shifted value of the potentiometer assembly $P_A$ can be had by considering a series of positions where the units are set. Suppose the object distance control member $CM_{OD}$ is set as seen in FIG. 1 so that the cam follower roller 24 has been shifted the distance $d_a$ from the base reference plan $AP_{OD}$ so that the voltage output from the sending unit 11 is $V_a$ as illustrated in FIG. 3. Now, if the potentiometer assembly $P_a$ is set at the desired value, the motor drive unit MDU will shift the focal length control member $CM_{FL}$ until the cam follower roller 34 is shifted the distance $d_b$ from the base reference plane $AP_{FL}$ as seen in FIG. 1 so that the voltage output from the focal length sending unit 12 is $V_b$ as seen in FIG. 3. It will be noted that at this position, the voltage $V_a$ is equal to voltage $V_b$ as indicated by the phantom line in FIG. 3 labelled $P_o$. This takes into account the situation in which the potentiometer assembly $P_A$ is set at the desired ratio.

Assume further, however, that one wants the ratio to be such that the voltage output $V_b'$ on the focal length voltage curve is to correspond to the voltage $V_A$ on the object distance voltage curve. If this is the case, then the potentiometer assembly $P_A$ would be shifted using the knob 15 until the voltage value $V_S$ was added to the voltage value $V_b'$ so that the apparent voltage in the output $O_{FL}$ of the sending unit 12 would be the value $V_b$ illustrated by the shifted dashed line curve in FIG. 3. It follows then that, when the movable contacts on the potentiometers $P_{A1}$ and $P_{A2}$ are set at the midpoint along the fixed resistances in the potentiometers, there is a one to one correspondence between the voltage of the output $O_{OD}$ and the voltage of the output of the $O_{FL}$. Further, if one assumes that the voltages $V_a$ and $V_b$ indicated in FIG. 3 on the solid line curves were derived when the potentiometers $P_{A1}$ and $P_{A2}$ are set at their midpoint, then the constant added to the focal length voltage curve to shift the voltage $V_b'$ is the value $V_S$. The value $V_S$ will be different depending on which points of correspondence on the focal length voltage curve one wants to correspond to the voltage $V_a$ on the object distance voltage curve. This will become more apparent.

Suppose the potentiometer assembly $P_A$ is set so that the focal length voltage curve is defined by the solid line curve in FIG. 3. Now, if the potentiometer assembly $P_A$ remains in the same position, and the object distance control member $CM_{OD}$ is rotated to a new position so that its associated sending unit 11 generates a voltage output $V_{as}$ as seen in FIG. 3, then the ratio base control unit 14 will cause the motor drive unit MDU to rotate the focal length control member $CM_{FL}$ so that the voltage output from its associated sending unit 12 will be changed to voltage $V_{bs}$ where the voltages $V_{as}$ and $V_{bs}$ are again equal. This is illustrated by the phantom line seen in FIG. 3 which is labelled $P_s$.

From the foregoing, it will be seen that the apparent voltage in the output $O_{FL}$ is the sum of the voltage attributable directly to the potentiometer $P_{FL}$ plus the voltage attributable to the potentiometer assembly $P_A$. This can be rewritten in the equation form so that the equation $$\text{voltage } P_{FL} + \text{voltage } P_A = \text{voltage } P_{OD}$$

is satisfied. It follows that, based on the above set forth relationships, this equation can be rewritten as $$K \log_x \frac{\text{actual focal length}}{\text{smallest focal length}} + K_V = K \log_x \frac{\text{actual object distance}}{\text{smallest object distance}}$$

which can be rewritten as $$K \log_x \frac{\text{actual object distance}}{\text{smallest object distance}} - K \log_x \frac{\text{actual focal length}}{\text{smallest focal length}} = K_V.$$

It will be noted that, as long as the potentiometer assembly $P_A$ remains at any one setting, the value $K_V$ also remains constant. Since K, x, smallest object distance, smallest focal length, are all constants, it follows that $\log_x$ actual object distance/$\log_x$ actual focal length also remains constant as long as the setting of the potentiometer assembly $P_A$ remains constant which implies that $$\frac{\text{actual object distance}}{\text{actual focal length}} = \text{constant}.$$

Thus, once the potentiometer assembly $P_A$ is set, the ratio of object distance to focal length is maintained constant which is the characteristic desired. It will further be understood that changing the potentiometer assembly $P_A$ to another constant will still cause the ratio to remain constant but to a constant of a different value. This is also a desired characteristic.

TABLE I

| Component | Value | Component | Value |
|---|---|---|---|
| $P_{FL}$ | 10K ohms | R4 | 10K ohms |
| $P_{OD}$ | 10K ohms | C1 | 125 μfd |
| R1 | 47K ohms | C2 | 0.1 μfd |
| R2 | 10K ohms | C3 | 0.1 μfd |
| R3 | 10K ohms | D2 | 25 v. |
| $P_{A1}$ | 20K ohms | D3 | 25 v. |
| $P_{A2}$ | 20K ohms | $BAT_I$ | 15 v. |

I claim:
1. An interlock mechanism for an operating system including first and second independently controllable operational control parameters comprising:
    first means for generating a first output which is the logarithmic value to a common base of the actual value of the first operational control parameter;
    second means for generating a second output which is the logarithmic value to the common base of the actual value of the second operational control parameter;
    control means operatively connected to said first means and said second means, said control means selectively and operatively connected to said second operational control parameter to selectively change the actual value of said second operational control parameter, said control means responsive to said first and second outputs to change the actual value of the second operational control parameter in response to change of the actual value of the first operational control parameter so that a prescribed ratio is maintained between the actual value of the first operational control parameter and the actual value of the second operational control parameter, and said control means including adjustment means for selectively changing the prescribed ratio maintained between the actual values of said first and second operational control parameters by said control means independently of the setting of said first and second control parameters.

2. An interlock mechanism for an operating system including first and second independently controllable operational control parameters comprising:

first means for generating a first voltage output which is representative of the logarithmic value to a common base of the actual value of the first operational control parameter;

second means for generating a second voltage output which is representative of the logarithmic value to the common base of the actual value of the second operational control parameter;

third means for selectively adding a prescribed voltage value to said second voltage output to generate a second apparent voltage output; and control means operatively connected to said first voltage output and said second apparent voltage output, and responsive to the difference between said first voltage output and said second apparent voltage output to change the actual value of the second operational control parameter in response to a change in the actual value of the first operational control parameter so that a prescribed ratio is maintained between the actual value of the first operational control parameter and the actual value of the second operational control parameter.

3. The interlock mechanism of claim 2 wherein said third means further includes means for selectively changing said prescribed voltage value added to said second voltage output to generate said second apparent voltage output.

4. The interlock mechanism of claim 3 wherein said third means includes a ganged potentiometer network.

5. The interlock mechanism of claim 4 wherein said first means includes a first linear potentiometer having a selectively movable first contact and means for selectively connecting said movable first contact to the first operational control parameter so that the voltage output from said movable first contact is representative of the logarithmic value to a common base of the actual value of the first operational control parameter; and, said second means includes a second linear potentiometer having a selectively movable second contact and means for selectively connecting said movable second contact to the second operational control parameter so that the voltage output from said movable second contact is representative of the logarithmic value to a common base of the actual value of the second operational control parameter.

6. The interlock mechanism of claim 4 wherein said control means is constructed and arranged to change the actual value of the second operational control parameter until said second apparent voltage output equals said first voltage output.

7. The interlock mechanism of claim 6 wherein said control means includes a first comparator operatively connected to said first voltage output and said second apparent voltage output; and a second comparator operatively connected to said first voltage output and said second apparent voltage output, said first comparator operational in response to said first voltage output being greater than second apparent voltage output to change the actual value of the second operational control parameter until said second apparent voltage output equals said firt voltage output and said second comparator means operational in response to said second apparent voltage output being greater than said first voltage output to change the actual value of the second operational control parameter until said second apparent voltage output equals said first voltage output.

* * * * *

UNITED STATES PATENT AND TRADEMARK OFFICE
CERTIFICATE OF CORRECTION

PATENT NO. : 4,145,732
DATED : 20 March 1979
INVENTOR(S) : DAVE PANDRES, JR.

It is certified that error appears in the above–identified patent and that said Letters Patent are hereby corrected as shown below:

Title page, References cited section, Foreign Patent Documents, last reference cited should read --899635      6/1962      United Kingdom      350/187--.

Signed and Sealed this

Eighteenth Day of September 1979

[SEAL]

Attest:

Attesting Officer

LUTRELLE F. PARKER
Acting Commissioner of Patents and Trademarks